United States Patent
Kim

(10) Patent No.: US 10,630,212 B2
(45) Date of Patent: Apr. 21, 2020

(54) DEVICE FOR CONTROLLING INVERTER

(71) Applicant: LSIS CO., LTD., Anyang-si, Gyeonggi-do (KR)

(72) Inventor: Kyoung-Sue Kim, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/267,981

(22) Filed: Feb. 5, 2019

(65) Prior Publication Data

US 2019/0245461 A1 Aug. 8, 2019

(30) Foreign Application Priority Data

Feb. 5, 2018 (KR) .................. 10-2018-0013706

(51) Int. Cl.
| | |
|---|---|
| *H02P 6/16* | (2016.01) |
| *H02P 6/00* | (2016.01) |
| *H02P 23/14* | (2006.01) |
| *H02P 1/02* | (2006.01) |
| *H02P 6/17* | (2016.01) |
| *H02P 6/28* | (2016.01) |
| *H02P 27/06* | (2006.01) |

(52) U.S. Cl.
CPC .............. *H02P 6/007* (2013.01); *H02P 1/029* (2013.01); *H02P 6/17* (2016.02); *H02P 6/28* (2016.02); *H02P 23/14* (2013.01); *H02P 27/06* (2013.01)

(58) Field of Classification Search
CPC ........................................ H02P 6/007
USPC .................................. 318/400.06
See application file for complete search history.

(56) References Cited

U.S. PATENT DOCUMENTS

2006/0049795 A1   3/2006   Iura et al.

FOREIGN PATENT DOCUMENTS

| EP | 1829200 B1 | 8/2012 |
|---|---|---|
| JP | H07250496 A | 9/1995 |
| JP | 2000253506 A | 9/2000 |
| JP | 2001078494 A | 3/2001 |
| JP | 2004350459 A | 12/2004 |

OTHER PUBLICATIONS

Korean Office Action for related Korean Application No. 10-2018-0013706; action dated Feb. 22, 2019; (6 pages).

(Continued)

*Primary Examiner* — Erick D Glass
(74) *Attorney, Agent, or Firm* — K&L Gates LLP

(57) ABSTRACT

The present invention relates to an inverter-controlling device. The inverter-controlling device include a main controller configured to generate a predetermined command current; a comparison module configured to calculate a difference between the command current and an output current of an inverting module; a current controller configured to perform a proportional-integral (PI) control based on the difference; and a frequency estimation module configured to estimate a rotation speed of a motor based on a current response to the command current while the command current is injected to the current controller, wherein the main controller is further configured: when a flying start operation of the inverting module begins, to set an output frequency of the inverting module based on the rotation speed of the motor estimated by the frequency estimation module.

9 Claims, 6 Drawing Sheets

(56) References Cited

OTHER PUBLICATIONS

European Search report for related European Application No. 19155395.7; action dated May 3, 2019; (8 pages).
Japanese Office Action for related Japanese Application No. 2019-016190; action dated Jan. 17, 2020; (3 pages).

DEVICE FOR CONTROLLING INVERTER

CROSS-REFERENCE TO RELATED APPLICATION

Pursuant to 35 U.S.C. § 119(a), this application claims the benefit of earlier filing date and right of priority to Korean Application No. 10-2018-0013706, filed on Feb. 5, 2018, in the Korean Intellectual Property Office, the disclosure of which is incorporated herein in its entirety by reference.

TECHNICAL FIELD

The present disclosure relates to a device for controlling an inverter.

BACKGROUND

An inverter is an inverting device that electrically converts DC to AC. An inverter used in the industry receives power supplied from a commercial power supply and varies a voltage and frequency of the power and supplies the varied power to a motor. Accordingly, the inverter may control a operation speed of the motor.

A dual high voltage inverter is an inverter whose voltage specification is in a range of 3300 to 11000V. The dual high voltage inverter is used to control a rotation speed of a large capacity motor with a capacity ranging from 600 kVA to 7.5 MVA, or to control a output torque.

In a system that drives a motor using such an inverter, various reasons may lead to restarting the inverter while the motor is rotating. For example, while a commercial power is cut off, such as in a momentary power failure, and thus the motor is free-running, the commercial power is re-input such that the inverter is restarted. This is called a flying start.

In this connection, the inverter has an excessive current, which causes a noise, etc. which is to be suppressed. In severe cases, a power element of the inverter may be damaged. Therefore, a method is required by which the inverter is easily restarted when the power is restored while the motor is in a free running state.

In a conventional case, an output voltage of the motor was measured and analyzed to control the motor based on a change in an active current. However, there is a problem in this approach in that when a residual counter electromotive force exists in the motor, it is difficult to analyze an output current of the motor, which disallows the flying start.

Accordingly, a method for controlling the motor by estimating a frequency of the counter electromotive force of the motor is used. However, in this approach, when a magnitude of the counter electromotive force is small to disallow the frequency estimation, the frequency estimation time becomes longer because a conventional flying start method should be employed.

SUMMARY

In order to solve the problem, a purpose of the present disclosure is to provide an inverter-controlling device that allows a flying start by estimating a rotation speed of a motor even when a counter electromotive force of a motor is very small.

In one aspect of the present disclosure, there is provided an inverter-controlling device for controlling an inverter system, wherein the inverter system includes: a rectifying module for rectifying power supplied from an alternate current (AC) power supply; a smoothing module for smoothing an output voltage from the rectifying module; and an inverting module including a plurality of switching elements for converting the smoothened voltage from the smoothing module into an AC voltage and for supplying the AC voltage to a motor, wherein the inverter-controlling device comprises: a main controller configured to generate a predetermined command current when the supply of the AC voltage to the motor stops; a comparison module configured to calculate a difference between the command current and an output current of the inverting module; a current controller configured to perform a proportional-integral (PI) control based on the difference; and a frequency estimation module configured to estimate a rotation speed of the motor based on a current response to the command current while the command current is injected to the current controller, wherein the main controller is further configured: when a flying start operation of the inverting module begins, to set an output frequency of the inverting module based on the rotation speed of the motor estimated by the frequency estimation module.

In one implementation, the command current includes an a, b and c phase command currents, wherein the a phase command current is a positive current of a predetermined magnitude, wherein each of the b phase and c phase commend currents is a negative current of a predetermined magnitude.

In one implementation, the magnitude of the a phase command current is ½ of a magnitude of a rated current of the motor.

In one implementation, the main controller is further configured to inject the command current to the current controller for a duration from a time when a counter electromotive force of the motor is smaller than a predetermined magnitude to a time when the flying start operation of the inverting module begins.

In one implementation, the main controller is further configured to maintain an output voltage of the inverting module at a constant magnitude while injecting the command current to the current controller.

In one implementation, the main controller is further configured: when the flying start operation of the inverting module begins, to set the output frequency of the inverting module to be equal to the rotation speed of the motor estimated by the frequency estimation module, or to set the output frequency of the inverting module to a frequency greater by at least a predetermined magnitude than the rotation speed of the motor estimated by the frequency estimation module.

In one implementation, the current controller is further configured to use a proportional (P) gain smaller than a proportional gain in a steady state while the command current is injected to the current controller.

In one implementation, the frequency estimation module is further configured to estimate a frequency by calculating twice an increment of a current response to the a phase command current to form a sinusoidal curve and by calculating a zero-crossing of the sinusoidal curve.

In one implementation, the frequency estimation module is further configured to estimate a frequency by subtracting a current response to the c phase command current from a current response to the b phase command current to form a sinusoidal curve and by calculating a zero-crossing of the sinusoidal curve.

In one implementation, the current controller is further configured to perform the proportional-integral (PI) control based on the difference to generate an output and to supply the generated output as a gate signal to the switching elements of the inverting module.

According to the present disclosure, a rough motor rotation speed is estimated by injecting DC current and analyzing a ripple current generated by the injected current. Then, performing the flying start based on the estimated motor rotation speed allows the flying start to be terminated within about 10% of a flying start duration of the conventional case.

Further, according to the present disclosure, even when it is difficult to accurately analyze the counter electromotive force of the motor, the motor rotation speed can be estimated quickly, such that the inverter can be restarted in a short time.

Further specific effects of the present disclosure as well as the effects as described above will be described in conduction with illustrations of specific details for carrying out the invention.

DETAILED DESCRIPTION

Figure 1:
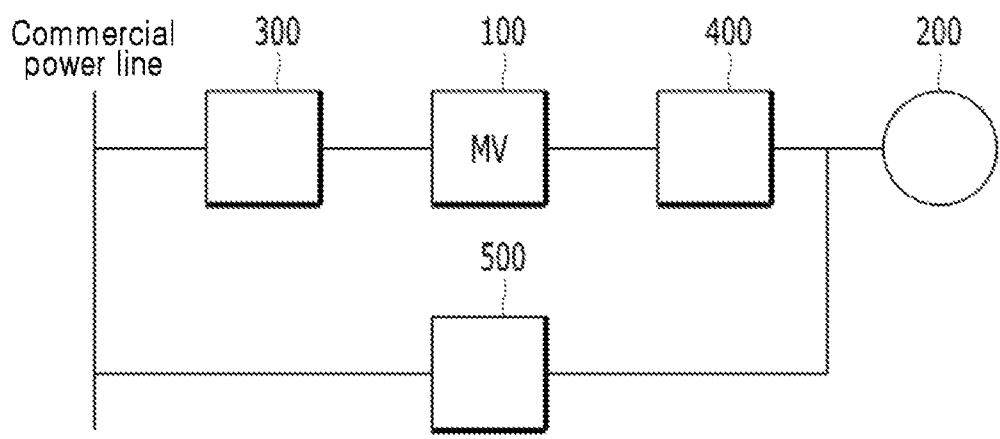
FIG. 1 shows a configuration a typical high-voltage motor system.

Hereinafter, a device for controlling an inverter in accordance with the present disclosure will be described with reference to the accompanying drawings.

For simplicity and clarity of illustration, elements in the figures. are not necessarily drawn to scale. The same reference numbers in different figures. denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Unless defined otherwise, all terms used herein have the same meaning as commonly understood by one of ordinary skill in the art. When the terms used herein are in conflict with a general meaning of the term, the meaning of the term is in accordance with a definition used herein.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Hereinafter, a conventional flying start technique will be described with reference to FIGS. 1 to 5. Then, an inverter-controlling device according to one embodiment of the present disclosure will be described with reference to FIGS. 6 to 11.

FIG. 1 shows a configuration of a typical high-voltage motor system.

As shown in FIG. 1, in the conventional high-voltage motor system, even when the high-voltage inverter 100 fails, a commercial power line is connected to a motor 200 to allow the motor 200 to operate using a commercial power. That is, a first switch 300 and a second switch 400 are configured for connecting the motor 200 and the high-voltage inverter 100 to each other. A third switch 400 is configured for connecting the motor 200 directly to the commercial power line.

While the motor 200 is being driven via the third switch 500 being connected to a commercial power source, the commercial power is not supplied to the motor due to an instantaneous power failure or the like and thus the motor 200 is free-running. In this case, when the commercial power is again supplied to the motor via electric power restoration, the high-voltage inverter 100 is connected to the motor 200 via the first and second switches 300 and 400, thereby to restart the motor 200. In this connection, the third switch 500 is in an off state.

Figure 2:
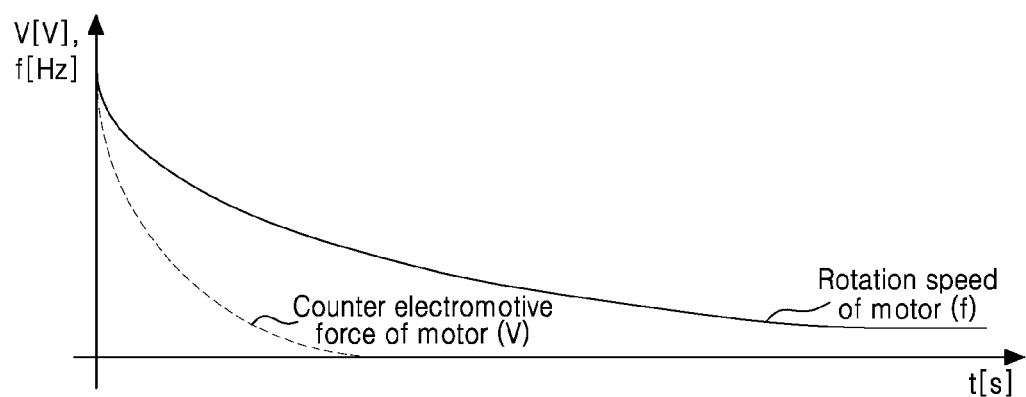
FIG. 2 shows an example of a change in a rotation speed and a counter electromotive force of a motor in a free-run state when a voltage supply to the motor is interrupted.

FIG. 2 shows an example of a change in a rotation speed and a counter electromotive force of a motor in a free-run state when a voltage supply to the motor is interrupted. As shown in FIG. 2, when the voltage supply to the motor 200 is cut off, both the counter electromotive force and rotation speed of the motor 200 are decreased.

Figure 3:
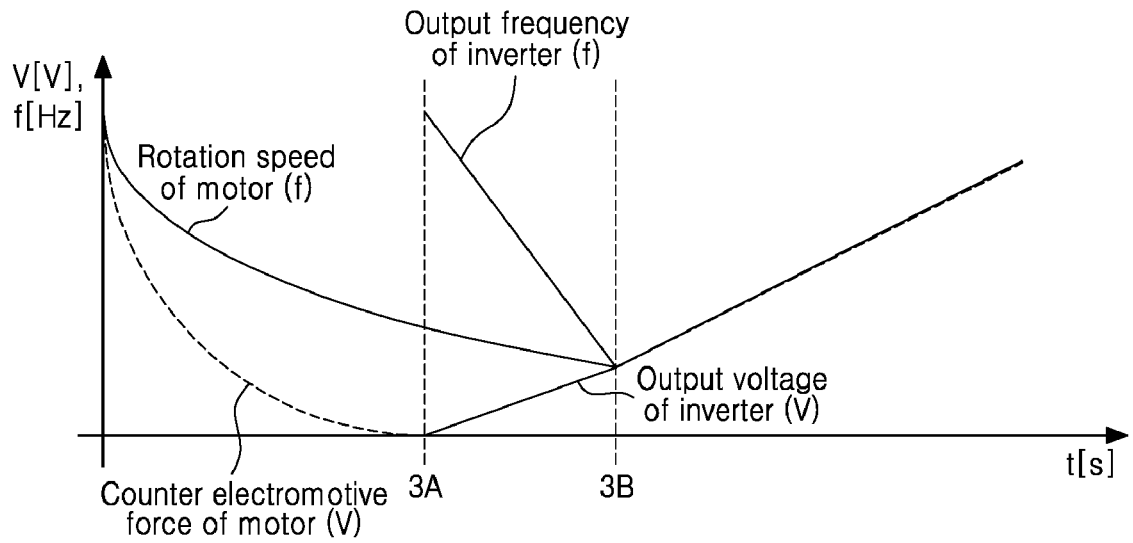
FIG. 3 is a graph for illustrating a flying start operation of a conventional inverter.
Figure 4:
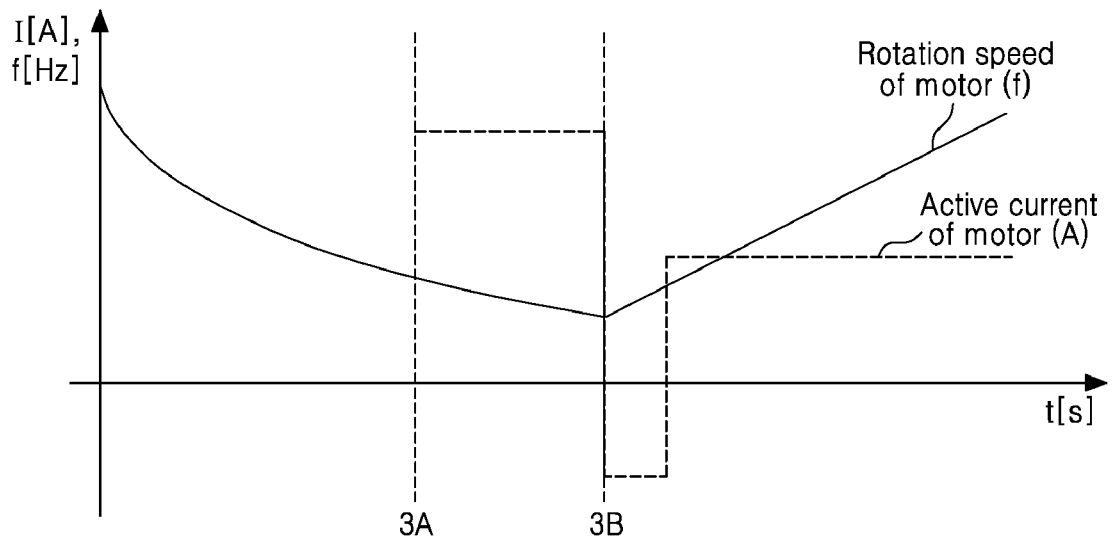
FIG. 4 is a graph of an example of a change in an active current of the motor in the operation as in FIG. 3.

FIG. 3 is a graph for illustrating a flying start operation of a conventional inverter. FIG. 4 is a graph of an example of a change in an active current of the motor in the operation as in FIG. 3.

At a start point 3A of the flying start operation, an output frequency f of the high-voltage inverter 100 begins to decrease from a maximum frequency, while an output voltage V of the high-voltage inverter 100 begins to increase from a minimum voltage.

At a completion point 3B of the flying start operation, the output frequency f of the high-voltage inverter 100 becomes equal to a rotation speed of the motor 200, while the output voltage V of the high-voltage inverter 100 starts to increase at a V/f ratio. A subsequent operation is controlled according to the V/f ratio.

Thus, a flying start control performs independent control between a voltage magnitude and a frequency during control of variable voltage variable frequency (VVVF) of the high-voltage inverter 100. When there is present a counter electromotive force in the motor 200, an internal circuit of the high-voltage inverter 100 may not operate. Thus, when the counter electromotive force is below a certain magnitude, the internal circuitry of the high-voltage inverter 100 begins to operate. The frequency of the high-voltage inverter 100 decreases continuously from the highest speed. When the frequency reaches an actual rotation speed of the motor 200, the frequency remains constant.

The V/f based control refers to a control scheme for keeping an internal magnetic flux of an induction motor 200 constant. In general, the V/f ratio is set at a ratio between a rated voltage/rated frequency. A user may change the ratio as a parameter.

A speed detection in this conventional flying start operation is achieved by observing an energy flow through the high-voltage inverter 100 and the motor 200. That is, referring to FIG. 4, when the output frequency of the high-voltage inverter 100 is faster than the rotation speed of motor 200, the energy flow occurs from the high-voltage inverter 100 toward the motor 200. Further, an active current of the motor 200 is detected in a positive direction.

When the output frequency continues to decrease and then the output frequency becomes smaller than the rotation speed of the motor 200, the energy flow occurs from the motor 200 toward the high-voltage inverter 100. The active current is detected in a negative direction.

Thus, in the conventional flying start control, when the detected active current of the motor 200 in the negative direction is held for a certain duration, the detection of the speed is completed and the operation is performed based on the V/f ratio.

Figure 5:
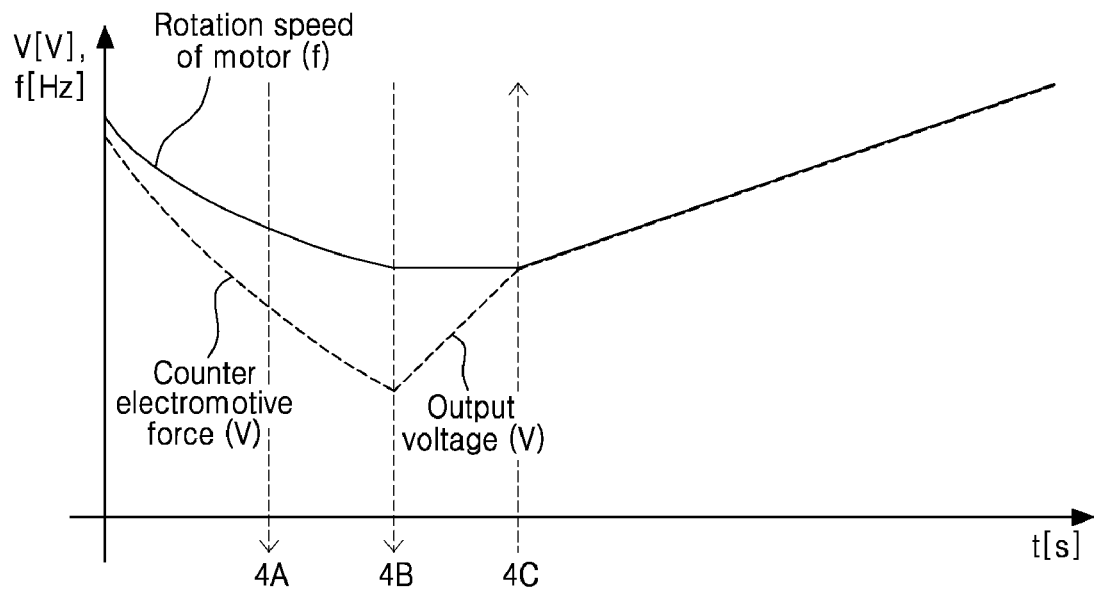
FIG. 5 is a graph for illustrating an operation of performing a flying start by measuring a counter electromotive force of a motor and estimating a motor rotation speed based on a frequency of the counter electromotive force in a prior art.

FIG. 5 is a graph for illustrating an operation of performing a flying start by measuring a counter electromotive force of a motor and estimating a motor rotation speed based on a frequency of the counter electromotive force in a prior art.

A conventional technique may measure a phase voltage applied to the high-voltage inverter 100 from the motor 200 and measure a counter electromotive force V of the motor 200. Then, the conventional technique uses a phase-locked loop (PLL) to generate a waveform of an output voltage V having a magnitude, phase, and frequency equal to those of the counter electromotive force V. Thus, the inverter 100 generates a voltage equal to the counter electromotive force V of the motor 200 based on the thus generated output voltage V at the start of the flying start operation.

The PLL refers to a circuit that matches an input signal and a reference frequency with an output signal and an output frequency respectively. The PLL detects a phase difference between the input signal and the output signal. The PLL controls a voltage controlled oscillator (VCO) to output an accurately-locked frequency signal.

Referring to FIG. 5, in a region 4A-4B, a waveform of the output voltage V that has a frequency, phase and magnitude equal to those of the counter electromotive force V due to the PLL is detected. In a 4B-4C region, a frequency of the motor 200, that is, a rotation speed f thereof is fixed and a magnitude of the output voltage of the inverter 100 is increased. At a point 4C, after the flying start is complete, the inverter may then be controlled based on the V/f ratio.

When, as shown in FIG. 3, the rotation speed f of the motor 200 is detected and the flying start is performed, not the output voltage of the motor 200 but reference information about the output voltage and output current of the high-voltage inverter 100 are taken into consideration.

On the other hand, when the rotation speed f of the motor 200 is detected based on the counter electromotive force of the motor 200 as shown in FIG. 5 to perform the flying start, the output voltage of the motor 200 is detected in the region where the counter electromotive force is present, thereby to detect the rotation speed f of the motor 200. In this connection, the output voltage of the motor 200 is detected via digitization at a 1 ms sampling duration using a voltage dividing resistor.

Thus, according to the conventional flying start method as in the case of FIG. 3, the output voltage of the motor 200 is measured and analyzed such that the motor operates according to the change of the active current. However, when there is a residual counter electromotive force in the motor 200, the flying start cannot be performed because it is difficult to analyze the output current information of the motor 200.

Further, according to the conventional flying start method as in FIG. 5, the counter electromotive force may be used to estimate the rotation speed of the motor 200. Thus, this may enable the flying start in a short time. However, when the counter electromotive force is small to disallow estimating the frequency, and disallow estimating the rotation speed, the flying start may not be implemented. In such a case, the frequency estimation time becomes larger.

The present disclosure is intended to solve the problems of the conventional technology. According to one embodiment of the present disclosure, a time duration required to estimate the motor rotation speed is shortened. Even when the counter electromotive force of the motor is very small, the motor rotation speed can be estimated quickly.

Figure 6:
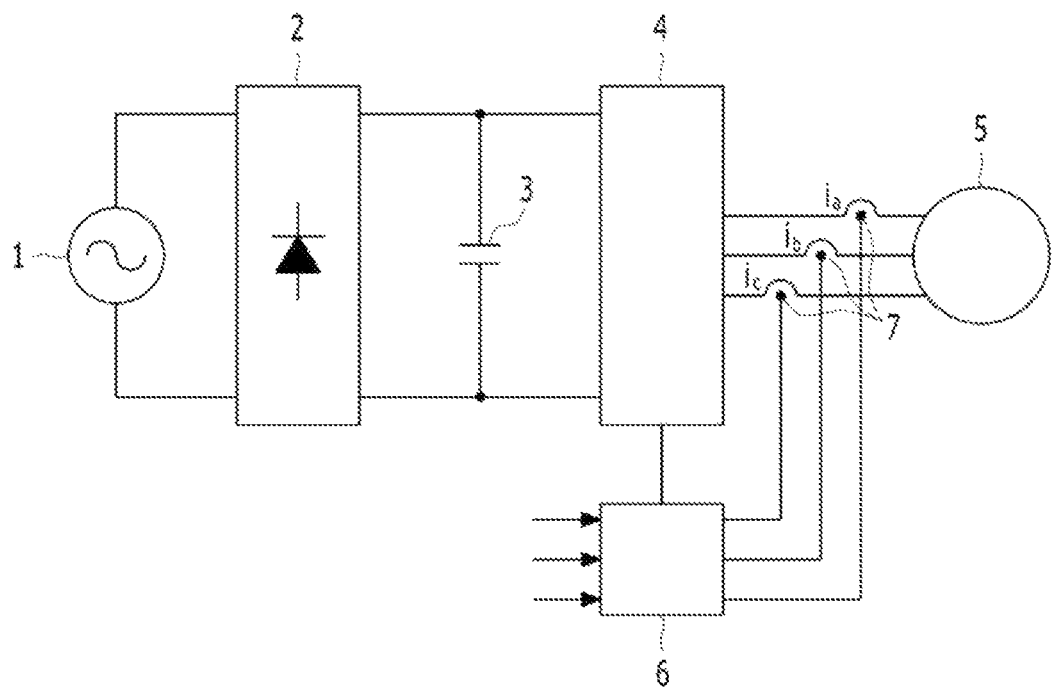
FIG. 6 is a configuration diagram for describing an inverter system of an embodiment of the present disclosure.

FIG. 6 is a configuration diagram to describe an inverter system in accordance with an embodiment of the present disclosure.

As shown in FIG. 6, an inverter system in accordance with one embodiment of the present disclosure may include a rectifying module 2 for rectifying power supplied from an AC power supply 1 such as a commercial power supply; a smoothing module 3 for smoothing an output voltage from the rectifying module 2; an inverting module 4 including a plurality of switching elements for converting the smoothened voltage from the smoothing module 3 into an AC voltage of a target frequency and magnitude; and a control device 6 that provides gate signals to the plurality of switching elements of the inverting module 4 and estimates a rotation speed of the motor 5 by analyzing an output current from the inverting module 4. The inverter system in accordance with one embodiment of the present disclosure may further include a detection module 7 that measures an output current output to a motor 5. The detection module 7 may be, for example, a current transformer CT.

Figure 7:
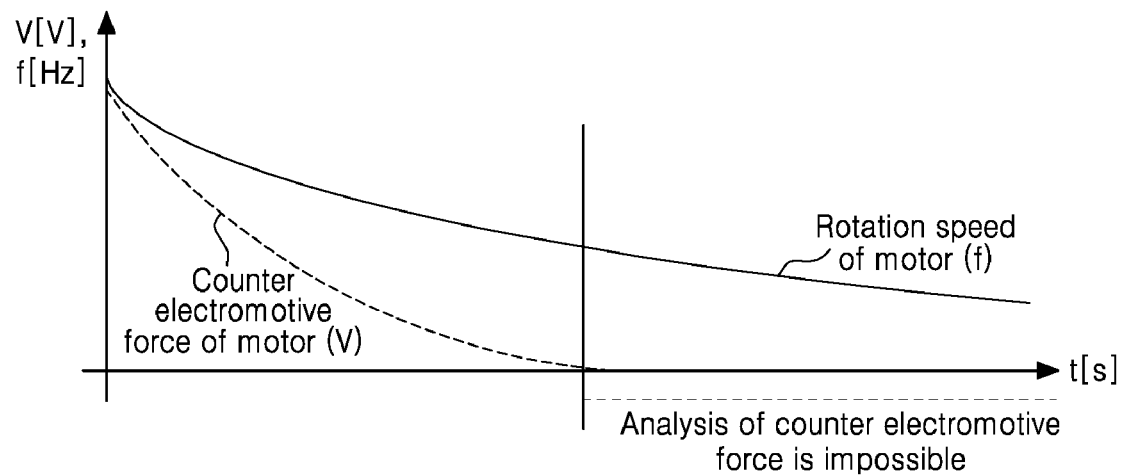
FIG. 7 depicts a graph for illustrating a period where a motor rotation speed may not be figured out.

FIG. 7 depicts a graph for illustrating a period where a motor rotation speed may not be figured out.

As shown in FIG. 7, in a region where a magnitude of the counter electromotive force of the motor is equal to or smaller than a predetermined magnitude (for example, 0), it is impossible to analyze the counter electromotive force of the motor even when the motor is rotating.

In order to quickly estimate the rotation speed f of the motor in the region where it is not possible to analyze the counter electromotive force of the motor, the control device 6 according to the present disclosure applies a DC current to the motor 5 and analyzes a ripple current resulting from the applied DC current. Further, the control device 6 according to the present disclosure estimates the rotation speed of the motor based on the ripple current. In this manner, the flying start is performed based on the estimated rotation speed of the motor. According to the present disclosure, the rotation speed of the motor can be estimated within about 10% of the estimation duration of the conventional technique. Thus, the quick restart of the motor 5 may be realized.

Figure 8:
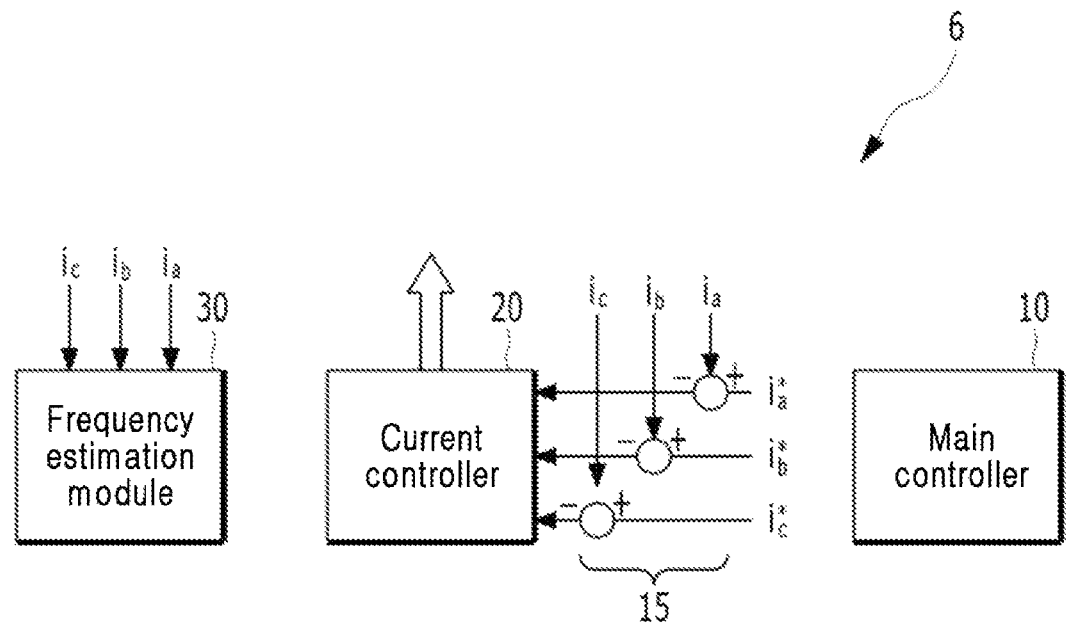
FIG. 8 shows a detailed configuration of a controller in FIG. 6.

FIG. 8 shows a detailed configuration of the control device 6 in FIG. 6.

As shown in the figure, the control device 6 according to one embodiment of the present disclosure may include a main controller 10, a current controller 20, a comparison module 15, and a frequency estimation module 30.

The current controller 20 generates a gate signal to be applied to the inverting module 4 such that the module 4 generates a voltage required to apply a target command current $i_a^*$, $i_b^*$, $i_c^*$ to the motor 5. The current controller may control an output frequency of the inverting module 4 by applying the gate signal to the switching elements of the inverting module 4.

The main controller 10 may generate command currents to be applied to the current controller 20.

In this connection, the command currents may be DC currents including a phase current being a positive current, b phase and c phase currents. Each of the b phase and c phase currents may be a negative current having a half magnitude of the a phase current. Each command current as a DC current refers to a current with a certain magnitude and a frequency of zero. In this connection, the magnitude of each DC current may vary depending on the configuration of the motor 5. For example, in one embodiment of the present disclosure, the magnitude of the a phase command current may be a positive current of a ½ magnitude of a rated current of the motor 2. The magnitude of each of the b phase and c phase command currents may be a negative current of a ½ magnitude of the a phase command current. However, it should be understood that the present disclosure is not limited thereto. The magnitude of each command current may be varied depending on the rating of motor 5.

In this connection, each command current may be injected for a predetermined time, for example, 200 ms. In one embodiment of the present disclosure, the frequency estimation module 30 estimates a frequency by analyzing the ripple current resulting from the application of each DC current. Therefore, the injection time of the command current is large enough to cause the ripple in the inverting module 4. However, the present disclosure is not limited thereto. Depending on the rating of the motor 5, the injection time of the command current may vary.

Figure 9:
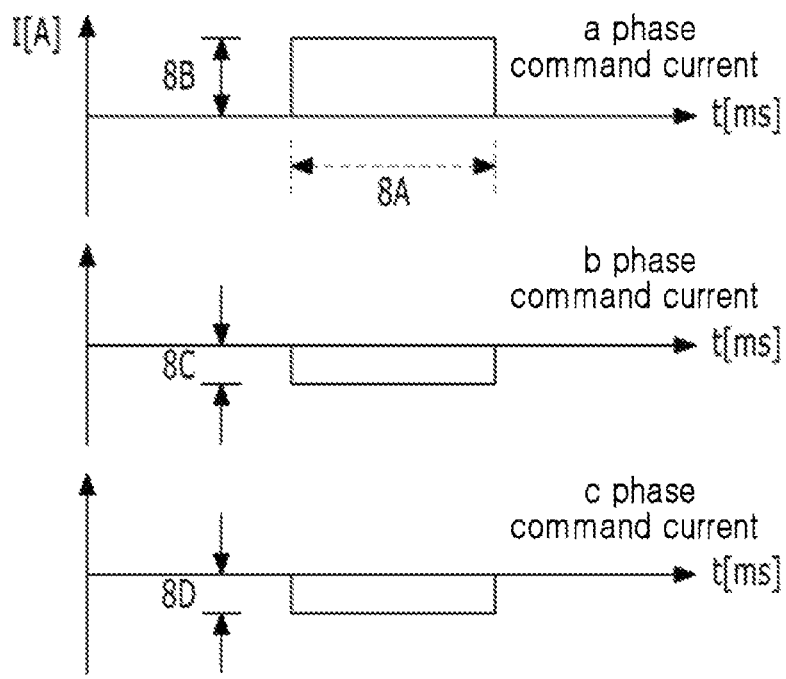
FIG. 9 is an example for describing a relationship between magnitudes of command currents in FIG. 8.

FIG. 9 is an example for describing a relationship between magnitudes of command currents in FIG. 8.

As described above, in one embodiment of the present disclosure, the a phase command current is a positive current of a predetermined magnitude 8B. Each of the b phase and c phase command currents may be a negative current of a magnitude 8C or 8D corresponding to ½ of the magnitude 8B of the a phase command current.

Further, in order to measure ripples caused by the a phase to c phase command currents, the a phase to c phase command currents may be applied for a certain duration of 8A.

In one embodiment of the present disclosure, the comparison module 15 may determine a difference between each command current and an output current of the inverter measured from the detection module 7, and may provide the difference to the current controller 20.

In one embodiment of the present disclosure, the current controller 20 may be a proportional-integral (PI) controller. The current controller 20 may perform a proportional-integral (PI) control based on the output value of the comparison module 15.

That is, the current controller 20 may multiply the outputs of the comparison module 15 by a specific proportional gain P to form first products. Then, the current controller 20 may multiply the products by a specific integral gain I to form second products. Then, the current controller 20 may integrate the second products to form an integrated sum. the current controller 20 may apply the sum as a gate signal to the plurality of switching elements of the inverting module 4.

The proportional control refers to controlling the output frequency of the inverting module 4 to allow the output frequency to be proportional to the output (deviation) of the comparison module 15. When the P gain is set to be large, a system response will be fast because the deviation rapidly change. However, when the P gain is set to be very large, the system becomes unstable.

The integral control is intended to correct the output frequency by integrating the deviations. For the proportional control, a large deviation may produce a large output frequency. When the deviation is small, an adjusted value of the output frequency becomes smaller. However, the proportional control cannot make the deviation zero. The integral control compensates for the limit of this proportional control. The integral correction of the output frequency may be performed by accumulating the deviations over the entire time, resulting in a deviation of zero. The I gain indicates how often the deviations are integrated.

In one embodiment of the present disclosure, the current controller 20 may use a P gain smaller than a P gain used for control of the inverter in a steady state, for a time duration 8A for which the command current is supplied for the current response measurement.

Figure 10:
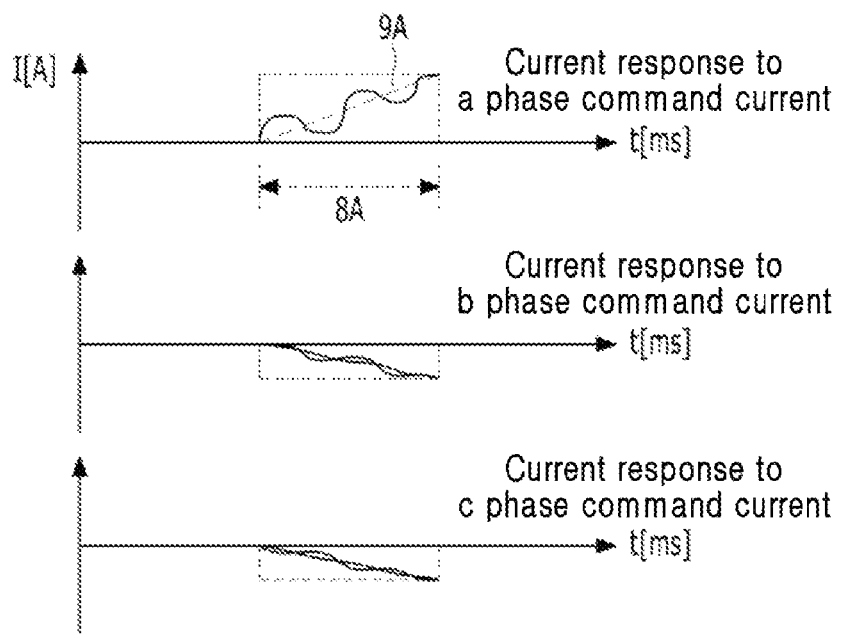
FIG. 10 is an example for describing a relationship between current responses to the command currents in FIG. 9.

FIG. 10 is an example for describing a relationship between current responses to the command currents in FIG. 9. The current responses may correspond to the outputs of the inverting module 4 in FIG. 6.

As shown in FIG. 10, the current responses to the command currents having the phase a to phase c at an output of the inverting module 4 may be expressed as ripple currents. A magnitude of a current response to the a phase current corresponds to twice a magnitude of each of the current responses to the b phase and c phase currents. The current response to the a phase current has an opposite direction to each of the current responses to the b phase and c phase currents. That is, the current response to the a phase current is a positive ripple current, while each of the current responses to the b phase and c phase currents is a negative ripple current.

Further, the current responses to the b phase and c phase currents are out-of-phases in an opposite direction.

A slope 9A along middle points of a sinusoidal curve in the current response to the a phase current corresponds to the P gain. This is also true for each of the current responses to the b phase and c phase currents.

The frequency estimation module 30 according to one embodiment of the present disclosure can estimate a frequency or a rotation speed f of the motor 5 using one or more of the a phase to c phase-based ripple currents.

For example, the frequency estimation module 30 calculates an first increment of the a phase-based current response corresponding to a predetermined time, for example, 1 ms. Then, the module computes a second increment of the a phase-based current response corresponding to a subsequent predetermined time (which is equivalent to twice derivative). Thus, the module 30 may obtain a sinusoidal curve of the a phase-based current response of FIG. 10. The module 30 may estimate the rotation speed of the motor 5 by calculating a zero-crossing of the generated sinusoidal curve.

Alternatively, referring to FIG. 10, the b phase-based current response and c phase-based current response are opposite in phases thereof. The frequency estimation module 30 subtracts the c phase-based current response from the b phase-based current response in FIG. 10 to obtain a sinusoidal curve. Then, the module 30 estimates the rotation speed of the motor 5 by calculating the zero-crossing of the resulting sinusoidal curve.

However, the manner in which the frequency estimation module 30 according to one embodiment of the present disclosure estimates the rotation speed of the motor 5 from the current responses in FIG. 10 is not limited to those described above. The frequency estimation may be realized in various ways.

The main controller 10 may perform the flying start of the inverter based on the rotation speed of the motor 5 estimated by the frequency estimation module 30.

Figure 11:
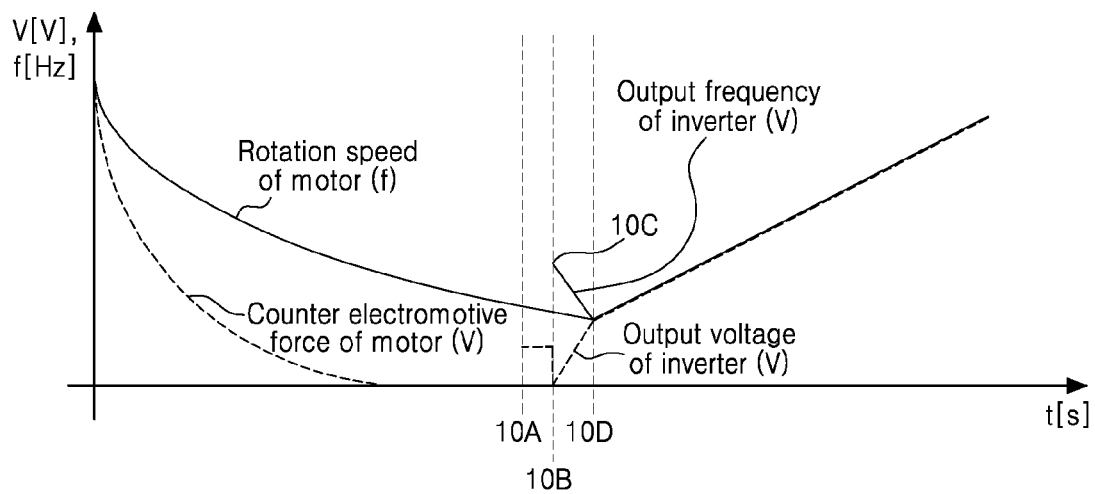
FIG. 11 is an example for describing a flying start operation according to one embodiment of the present disclosure.

FIG. 11 illustrates an example graph for describing a flying start operation according to one embodiment of the present disclosure. This operation may be an operation of the inverter under the control of the main controller 10.

As shown in FIG. 11, while the supply of the commercial power is interrupted such that the rotation speed f of the motor is reduced and the counter electromotive force V of the motor is reduced, the supply of the commercial power is re-activated. In this connection, according to the conventional technique, the magnitude of the counter electromotive force of the motor 5 may be small and thus the flying start may not be realized.

However, in one embodiment of the present disclosure, the main controller 10 provides the command currents to the current controller 20 for a duration from a predetermined point in time, i.e., 10A to a start point 10B of the flying start operation. In this connection, the time 10A at which the provision of the command currents starts may be set to a time when a magnitude of the counter electromotive force V of the motor 5 is equal to or smaller than a predetermined magnitude, for example, 0. Further, the command current injection duration may be set to a predetermined duration, for example, 200 ms. However, the command current injection duration may vary depending on embodiments.

During the time main controller 10 injects the command currents into the current controller 20, that is, for a duration from a point 10A to a point 10B, the frequency estimation module 30 may estimate the frequency or rotation speed f of the motor 5. In this connection, during the time main controller 10 injects the command currents into the current controller 20, that is, for a duration from a point 10A to a point 10B, the main controller 10 may maintain the output voltage V of the inverting module 4 to have a constant magnitude.

When the flying start operation starts at the point 10B, the main controller 10 sets the output frequency F of the inverting module 4 to the rotation speed of the motor 5 as estimated by the frequency estimation module 30. Alternatively, the main controller 10 sets the output frequency to a frequency that is greater by at least a predetermined magnitude than the rotation speed of the motor 5 as estimated by the frequency estimation module 30. The controller 10 decreases the output frequency F of the inverting module 4 by a point when the flying start operation is completed, that is, by a point 10D.

At the time point 10D when the rotation speed f of the motor 5 becomes equal to the inverter output frequency F, the flying start operation is completed. The motor 5 operates based on the output frequency F of the inverter at the time point of 10D. The main controller 10 increases the inverter output voltage V from zero for a duration from the time point 10B at which the flying start operation starts to the time point 10D at which the flying start operation ends.

After the end of the flying start at 10D, the main controller 10 adjusts the output voltage V of the inverting module 4 according to the V/f ratio.

As shown in FIG. 11, according to the present disclosure, the flying start operation is performed at the maximum output frequency of the inverter as in the conventional technology, but the flying start operation is started based on the rotation speed f of the motor 5 as estimated by the frequency estimation module 30. Therefore, the flying start operation is completed in a shorter time than in the conventional technique.

According to the present disclosure, the motor rotation speed is estimated by injecting the DC currents and analyzing the ripple currents resulting from the injected currents. Then, performing of the flying start based on the estimated motor rotation speed may allow the flying start operation to be completed within about 10% of the duration of the flying start operation in the conventional case.

In addition, even when the counter electromotive force cannot be accurately analyzed in the conventional case, the motor rotation speed can be estimated quickly in accordance with the present disclosure so that the inverter can be restarted in a short time.

It will be apparent to those skilled in the art that various modifications and variations may be made in the present invention without departing from the spirit of the present disclosure. The technical scope of the present disclosure is not limited to the contents described in the embodiments but should be determined by the claims and equivalents thereof.

What is claimed is:

1. An inverter-controlling device for controlling an inverter system, wherein the inverter system comprises an inverting module including a plurality of switching elements for a supply of an AC voltage to a motor, the inverter-controlling device including:
    a main controller configured to generate a predetermined command current when the supply of the AC voltage to the motor stops;
    a comparison module configured to calculate a difference between the command current and an output current of the inverting module;
    a current controller configured to perform a proportional-integral (PI) control based on the difference; and
    a frequency estimation module configured to estimate a rotation speed of the motor based on a current response to the command current while the command current is injected to the current controller,
    wherein the main controller is further configured to inject the command current to the current controller for a duration from a time when a counter electromotive force of the motor is smaller than a predetermined magnitude to a time when a flying start operation of the inverting module begins,
    wherein the main controller is further configured when the flying start operation of the inverting module begins, to set an output frequency of the inverting module based on the rotation speed of the motor estimated by the frequency estimation module.

2. The inverter-controlling device of claim 1, wherein the command current includes an a-phase command current, a b-phase command current, and a c-phase command current, wherein the a-phase command current is a positive current of a predetermined magnitude, wherein each of the b-phase command current and the c-phase command current is a negative current of a predetermined magnitude.

3. The inverter-controlling device of claim 2, wherein the frequency estimation module is further configured to estimate a frequency by calculating twice an increment of a current response to the a-phase command current to form a sinusoidal curve and by calculating a zero-crossing of the sinusoidal curve.

4. The inverter-controlling device of claim 2, wherein the frequency estimation module is further configured to estimate a frequency by subtracting a current response to the c-phase command current from a current response to the b-phase command current to form a sinusoidal curve and by calculating a zero-crossing of the sinusoidal curve.

5. The inverter-controlling device of claim 1, wherein the magnitude of the a-phase command current is ½ of a magnitude of a rated current of the motor.

6. The inverter-controlling device of claim 1, wherein the main controller is further configured to maintain an output voltage of the inverting module at a constant magnitude while injecting the command current to the current controller.

7. The inverter-controlling device of claim 1, wherein the main controller is further configured:
    when the flying start operation of the inverting module begins, to set the output frequency of the inverting module to be equal to the rotation speed of the motor estimated by the frequency estimation module, or to set the output frequency of the inverting module to a frequency greater by at least a predetermined magnitude than the rotation speed of the motor estimated by the frequency estimation module.

8. The inverter-controlling device of claim 1, wherein the current controller is further configured to use a proportional (P) gain smaller than a proportional gain in a steady state while the command current is injected to the current controller.

9. The inverter-controlling device of claim 1, wherein the current controller is further configured to perform the proportional-integral (PI) control based on the difference to generate an output and to supply the generated output as a gate signal to the plurality of switching elements of the inverting module.

* * * * *